United States Patent
Ma et al.

(10) Patent No.: US 8,424,836 B2
(45) Date of Patent: Apr. 23, 2013

(54) BIDIRECTIONAL FORCE FEEDBACK POPPET VALVE

(75) Inventors: Pengfei Ma, Naperville, IL (US);
Philippe Vande Kerckhove, Naperville, IL (US); James Alvin Aardema, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 1478 days.

(21) Appl. No.: 11/454,500

(22) Filed: Jun. 16, 2006

(65) Prior Publication Data

US 2007/0290153 A1 Dec. 20, 2007

(51) Int. Cl.
*F16K 31/12* (2006.01)

(52) U.S. Cl.
USPC .............................. 251/30.03; 251/43; 251/44

(58) Field of Classification Search ............... 251/30.02, 251/33, 43, 44, 129.15, 30.01, 30.03
See application file for complete search history.

(56) References Cited

U.S. PATENT DOCUMENTS

| | | | |
|---|---|---|---|
| 2,480,712 A | 4/1945 | Carbon |
| 4,173,867 A | 11/1979 | Schmidt et al. |
| 4,315,436 A | 2/1982 | McCabe et al. |
| 5,072,752 A | 12/1991 | Kolchinsky |
| 5,331,882 A | 7/1994 | Miller |
| 5,421,545 A | 6/1995 | Schexnayder |
| 5,515,879 A | 5/1996 | Mollo |
| 5,645,263 A | 7/1997 | Aardema |
| 5,878,647 A | 3/1999 | Wilke et al. |
| 6,012,644 A | 1/2000 | Sturman et al. |
| 6,131,606 A | 10/2000 | O'Neill |
| 6,149,124 A | 11/2000 | Yang |
| 6,158,470 A | 12/2000 | Ivers et al. |
| 6,328,275 B1 | 12/2001 | Yang et al. |
| 6,330,798 B1 | 12/2001 | Stephenson |
| 6,374,808 B1 | 4/2002 | Fulford et al. |
| 6,457,487 B1 | 10/2002 | Stephenson et al. |
| 6,691,910 B2 | 2/2004 | Hirose et al. |
| 6,745,992 B2 | 6/2004 | Yang et al. |
| 6,869,060 B2 | 3/2005 | Barber et al. |
| 6,883,474 B2 | 4/2005 | Bucknor |
| 6,886,510 B2 | 5/2005 | Sun et al. |
| 6,959,673 B2 | 11/2005 | Sun |
| 6,959,837 B2 | 11/2005 | Shermer et al. |
| 6,971,347 B1 | 12/2005 | Sun |
| 2007/0290151 A1 | 12/2007 | Muller |

FOREIGN PATENT DOCUMENTS

| | | |
|---|---|---|
| JP | 04058464 | 3/1992 |
| JP | 062009892 | 9/1994 |
| JP | 11149340 | 5/1999 |
| JP | 2000337304 | 5/1999 |
| JP | 2002130588 | 5/2002 |
| WO | WO 2004/102011 | 11/2004 |

*Primary Examiner* — John K Fristoe, Jr.
*Assistant Examiner* — Kevin E Lynn
(74) *Attorney, Agent, or Firm* — Finnegan, Henderson, Farabow, Garrett & Dunner LLP; Jonathan V. Trousdale

(57) ABSTRACT

A valve has a valve body including a main chamber having a first port and a second port, and a main poppet disposed within the main chamber. The main poppet includes a first surface forming a control chamber within the main chamber. The valve has a first passage communicating the control chamber with the first port, and a second passage communicating the control chamber with the second port. The valve also includes a pilot valve having a pilot poppet for controlling fluid flow from the control chamber to the first port through a third passage, and to the second port through a fourth passage, respectively. The valve may further have a feedback spring coupled between the main poppet and the pilot poppet to provide a force relative to a distance between the main poppet and the pilot poppet.

25 Claims, 5 Drawing Sheets

BIDIRECTIONAL FORCE FEEDBACK POPPET VALVE

TECHNICAL FIELD

The present disclosure relates generally to a force feedback poppet valve, and more particularly, to a bidirectional force feedback poppet valve.

BACKGROUND

Construction and agricultural equipment have moveable members that employ hydraulic structures including a hydraulic cylinder and piston arrangement. These structures can be controlled by one or more poppet valves that control the flow of hydraulic fluid to these structures. Some poppet valves include a control chamber connected to an inlet port through a meter-in orifice and to an outlet port through a meter-out orifice. Opening of the poppet valve is controlled by controlling fluid flow through the meter-out orifice to reduce the control pressure in the control chamber such that the inlet pressure urges a poppet of the poppet valve off a valve seat when the control pressure drops below the inlet pressure in the inlet port. The meter-out orifice is controlled by a pilot valve, which can be selectively opened by applying an electric current on an actuator connected to the pilot valve.

One of the problems associated with such poppet valve designs is that the poppet valve can be opened only when the pressure in the inlet port is higher than the pressure in the outlet port. If the pressure in the outlet port is higher than the pressure in the inlet port, the poppet valve cannot be opened. It is desirable to have a poppet valve openable in both situations.

U.S. Pat. No. 6,328,275 (the '275 patent) issued to Yang et al. discloses a pilot-operated poppet valve to control a bidirectional flow of fluid between two ports. The poppet valve disclosed in the '275 patent includes a first passage extending between a control chamber and a first port. A check valve allows fluid to flow through the first passage only in the direction from the first port to the control chamber. A second passage extends between the control chamber and the second port. Another check valve allows fluid to flow through the second passage only in the direction from the second port to the control chamber.

The system of the '275 patent may provide a bidirectional pilot operated control valve, but the system of the '275 patent employs a direct feedback mechanism, in which the maximum opening of the poppet valve is limited by the movement of the pilot poppet.

The disclosed system is directed to overcoming one or more of the problems set forth above.

SUMMARY OF THE INVENTION

In one aspect, the present disclosure is directed to a force feedback poppet valve. The force feedback poppet valve may include a valve body including a main chamber having a first port and a second port, and a main valve poppet disposed within the main chamber. The main valve poppet may be slidable between an open position and a closed position to control fluid flow between the first port and the second port, and may include a first surface forming a control chamber within the main chamber. The force feedback poppet valve may further include a first passage communicating the control chamber with the first port, and a second passage communicating the control chamber with the second port. The first passage may have a check valve therein allowing fluid to flow from the first port to the control chamber, and the second passage may have a check valve therein allowing fluid to flow from the second port to the control chamber. The force feedback poppet valve may further include a pilot valve having a pilot valve poppet for controlling fluid flow between the control chamber and the first port through a third passage, and for controlling fluid flow between the control chamber and the second port through a fourth passage. The force feedback valve may further include a feedback spring coupled between the main valve poppet and the pilot valve poppet to provide a feedback force relative to a distance between the main poppet and the pilot poppet.

In another aspect, the present disclosure is directed to a method of controlling fluid communication between a first port and a second port defined by a main chamber, the main chamber having a main valve poppet slidably received within the main chamber. The main valve poppet may be adapted to block the fluid communication between the first port and the second port in a closed position, and allow the fluid communication between the first port and the second port in an open position. The main valve poppet may have a first surface forming a control chamber within the main chamber. The method may include opening a pilot valve to allow a flow of fluid from the control chamber to one of the first port and the second port whichever has a lower pressure. The method may further include directing a flow of fluid from one of the first port and the second port whichever has a higher pressure to the control chamber. When combined force acting on the main poppet in the valve opening direction is greater than combined force acting on the main poppet in the valve closing direction, the main poppet may be moved in the valve opening direction to allow the fluid communication between the first port and the second port. The method may also include applying a force relative to a distance between the main poppet and the pilot valve to close the pilot valve.

DETAILED DESCRIPTION

Figure 1:
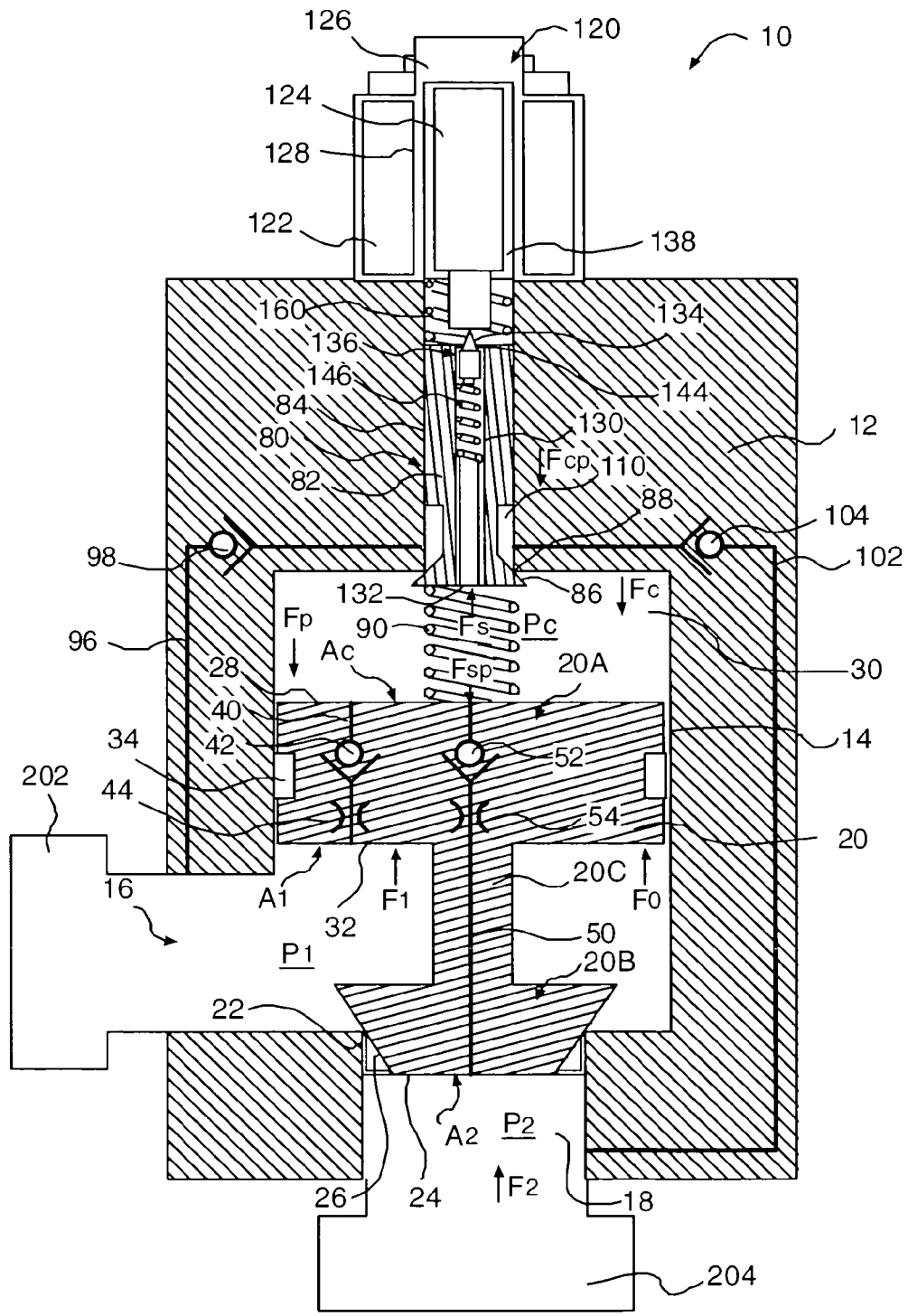
FIG. 1 is a sectional view of an exemplary force feedback poppet valve according to one embodiment of the disclosure.

FIG. 1 illustrates an exemplary force feedback poppet valve 10. The force feedback poppet valve 10 may include a valve body 12 having a main chamber 14. The main chamber 14 may include a first port 16 at a side wall of the main chamber 14 and a second port 18 at a bottom of the main chamber 14. The force feedback poppet valve 10 may include a main poppet 20 slidably disposed within the main chamber 14. The main poppet 20 may include a first end portion 20A, a second end portion 20B, and a central portion 20C connecting the first end portion 20A with the second end portion 20B.

The first end portion 20A of the main poppet 20 may include an upper surface 28 (a first surface), which forms a control chamber 30 with inner walls of the main chamber 14.

The upper surface 28 may have an effective surface area value Ac exposed to fluid in the control chamber 30. The first end portion 20A of the main poppet 20 may also include a lower surface 32 (a second surface) adapted to be in contact with fluid received in the first port 16. The main poppet 20 may further include a sealing ring 34 mounted on sidewalls of the main poppet 20 to prevent fluid from leaking between the control chamber 30 and the first port 16 along the sidewalls of the main poppet 20.

The second end portion 20B may include an end surface 24 (a third surface) and a seating surface 26. Seating surface 26, may be conical as shown in FIG. 1, or any other appropriate shape. The upper surface 28 of the main poppet 20 exposed to the fluid in the control chamber 30 may have an effective surface area Ac. The area of the end surface 24 and the area of the seating surface 26 exposed to the fluid in the second port 18 may have an effective surface area value A2. An effective surface area A1 on the lower surface 32 may be defined by A1=Ac−A2. In one embodiment, the effective surface area A1 substantially equals to the effective surface area A2; and the surface area Ac of the upper surface 28 of main poppet 20 equals to the effective surface area A1 plus the effective surface area A2 (Ac=A1+A2=2A1=2A2.) The seating surface 26 may be adapted to sealingly engage a valve seat 22 of the second port 18 when the main poppet 20 is in a closed position, and thus may block fluid communication between the first port 16 and the second port 18. When the seating surface 26 is moved away from the valve seat 22, fluid may flow between the first port 16 and the second port 18 through a meter-out orifice 113.

A first passage 40 may extend from the first port 16 to the control chamber 30. The first passage 40 may include a check valve 42 allowing fluid to flow only from the first port 16 to the control chamber 30. The first passage 40 may also include a meter-in orifice 44 for restricting the flow of the fluid in the first passage 40. A second passage 50 may extend from the second port 18 to the control chamber 30. The second passage 50 may include a check valve 52 allowing fluid to flow only from the second port 18 to the control chamber 30. The second passage 50 may also include a meter-in orifice 54 for restricting the flow of the fluid in the second passage 50. The first passage 40 and the second passage 50 may be formed in the main poppet 20 (as shown in FIG. 1) or may be formed in the valve body 12 (not shown). The above-described orifices 44, 54 may be a variable orifice or a fixed orifice.

As shown in FIG. 1, the force feedback poppet valve 10 may further include a pilot valve 80. The pilot valve 80 may include a pilot poppet 82 slidably disposed in a bore 84 defined within the pilot valve 80. The pilot poppet 82 may include a valve seating portion 86 at a lower end of the pilot poppet 82. A valve seat 88 may be formed at a lower end of the bore 84 for receiving the valve seating portion 86 of pilot poppet 82. The valve seating portion 86 may be adapted to sealingly engage the valve seat 88. A compression feedback spring 90 may be coupled between the main poppet 20 and the pilot poppet 82.

As shown in FIG. 1, the pilot poppet 82 may include an annular chamber 110 defined on side walls of the pilot poppet 82. A third passage 96 formed in the valve body 12 may extend from the first port 16 to the annular chamber 110. The third passage 96 may include a third check valve 98 in the third passage 96 which may allow the fluid to flow only from the annular chamber 110 to the first port 16. A fourth passage 102 formed in the valve body 12 may extend from the second port 18 to the annular chamber 110. The fourth passage 102 may include a fourth check valve 104 in the fourth passage 102 which may allow fluid to flow only from the annular chamber 110 to the second port 18. When the pilot poppet 82 is in a closed position (the valve seating portion 86 of the pilot poppet 82 is sealingly received in the valve seat 88), fluid communication between the control chamber 30 and the annular chamber 110 is blocked. When the pilot poppet 82 is in an open position, the annular chamber 110 fluidly communicates with the control chamber 30 through a meter-out orifice 111.

As shown in FIG. 1, the force feedback poppet valve 10 may further include an actuator 120 for controlling the pilot valve 80. In one embodiment, the actuator 120 may be a solenoid actuator including an electromagnetic coil 122 and an armature 124. The electromagnetic coil 122 may be located around and secured to a cartridge or housing 126. The armature 124 may be positioned within a tube 128 defined within the cartridge 126. The armature 124 may be adapted to exert a downward force to move the pilot poppet 82. When electric current is applied to the electromagnetic coil 122, an electromagnetic field is created, and in response, the armature 124 slides within the cartridge tube 128 toward the pilot poppet 82. The armature 124 may force the pilot poppet 82 to move toward the main poppet 20. This results in moving the pilot poppet 82 away from the valve seat 88 and thereby opening fluid communication between the control chamber 30 and the annular chamber 110. When the actuator 120 is deactivated, the feedback spring 90 biases the pilot poppet 82 toward the valve seat 88, closing off the bottom end of the bore 84. In this situation, there is no fluid flow between the annular chamber 110 and the control chamber 30. The force feedback poppet valve 10 may further include a stabilizer spring 160 coupled to an upper end of the pilot poppet 82 to bias the force applied by the feedback spring 90 to the pilot poppet 82.

As shown in FIG. 1, the force feedback poppet valve 10 may include an armature chamber 138 at the upper end of the pilot poppet 82. The pilot poppet 82 may include a pilot passage 130 having a first opening 132 at one end that is connected to the control chamber 30 and a second opening 134 at the other end that is connected to the armature chamber 138. The force feedback poppet valve 10 may further include a needle valve 136. The needle valve 136 is adapted to selectively open the second opening 134 of the pilot passage 130 when the needle valve 136 is pushed down by the armature 124. In one embodiment, the second opening 134 may be a relatively small aperture.

Figure 2:
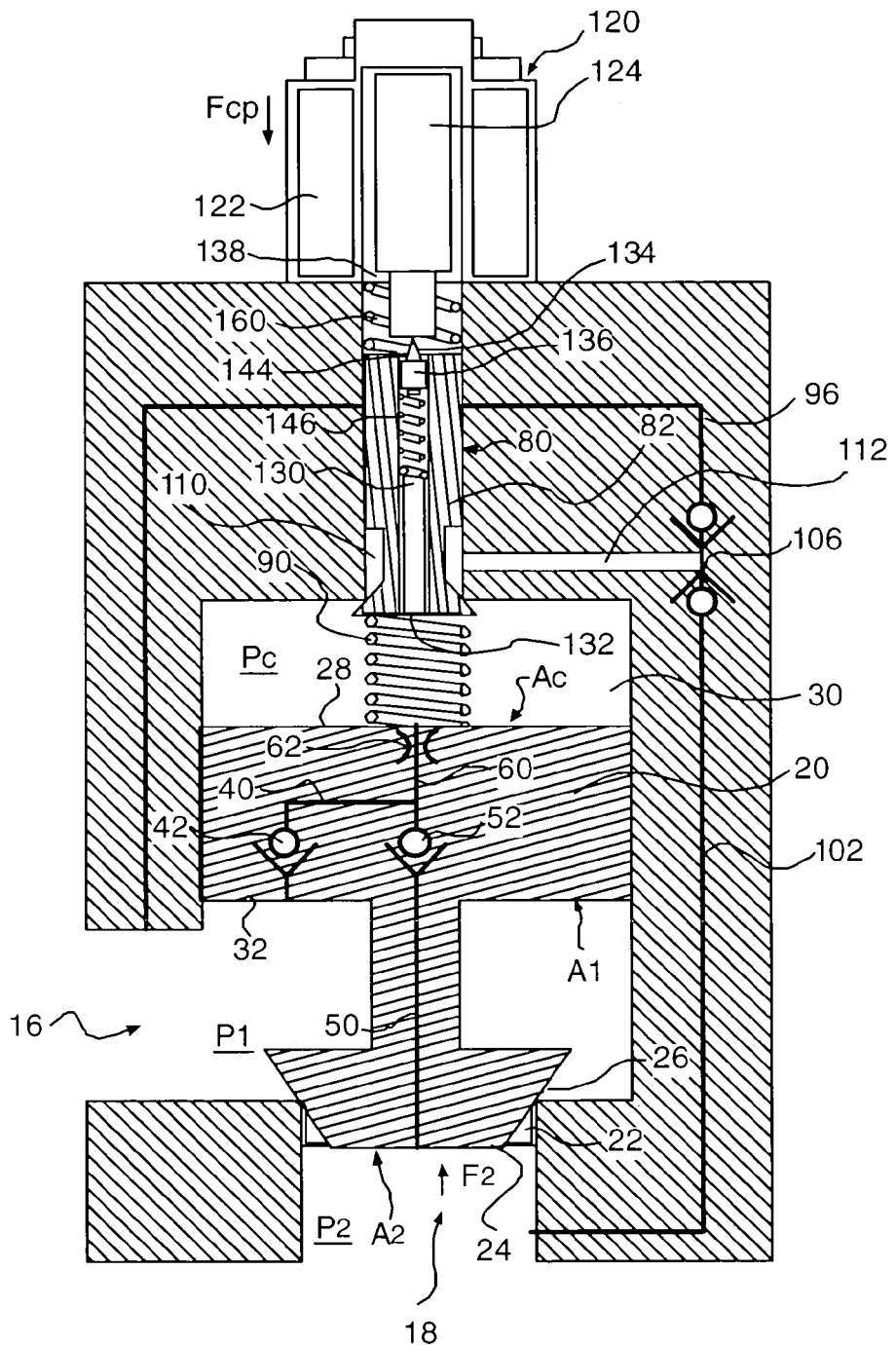
FIG. 2 is a sectional view of an exemplary force feedback poppet valve according to another embodiment of the disclosure.
Figure 3:
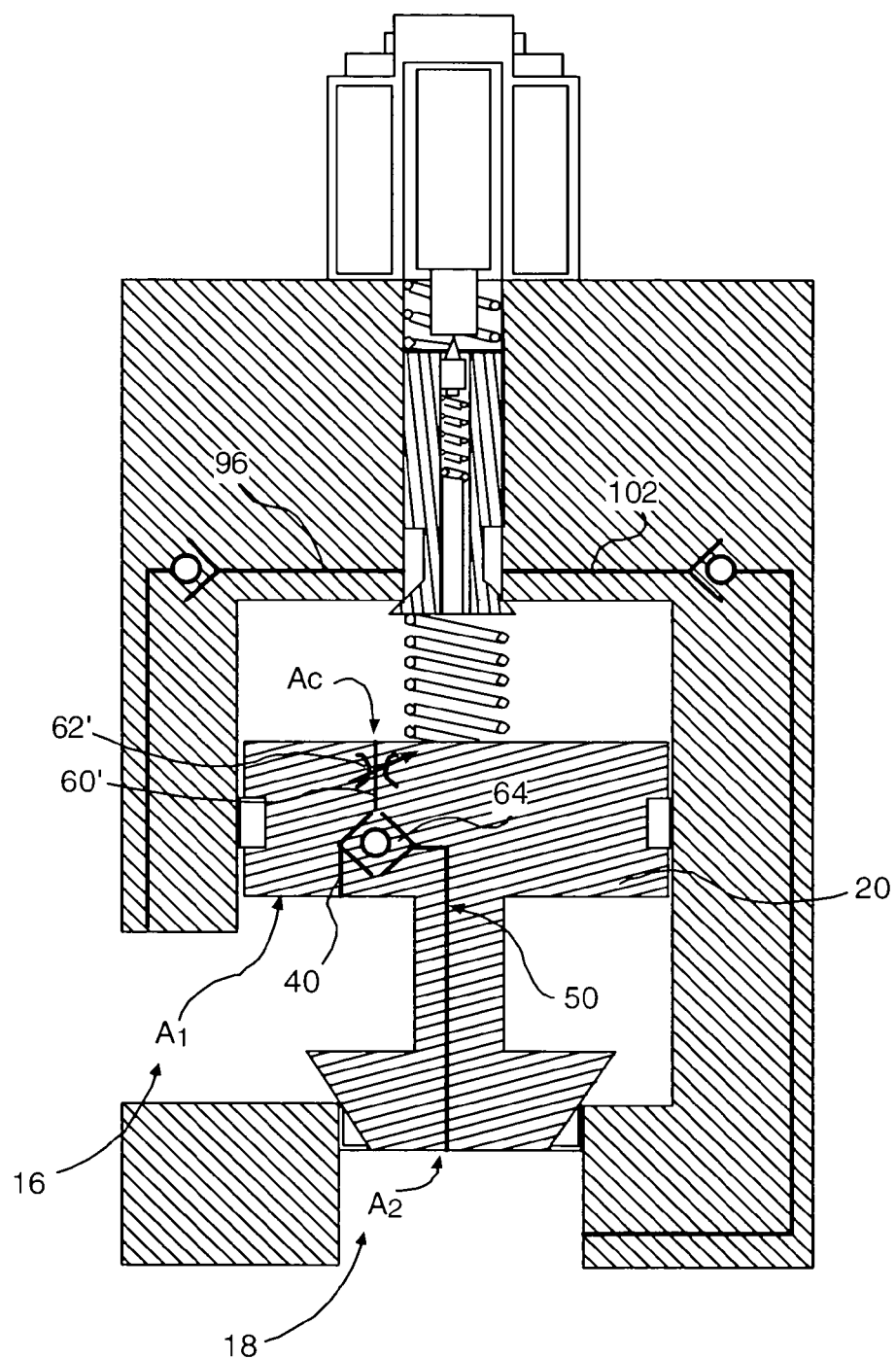
FIG. 3 is a sectional view of an exemplary force feedback poppet valve according to yet another embodiment of the disclosure.

In one alternate embodiment as shown in FIG. 2, the first and the second passages 40 and 50 extending into the control chamber 30 may be connected to the control chamber 30 through a common portion (denoted as a common passage 60). The first passage 40 and the second passage 50 may have a common meter-in orifice 62. The third passage 96 and the fourth passage 102 extending to the annular chamber 110 may have a common passage 112 and a common check valve 106 at the intersection of the third passage 96 and the fourth passage 102. In another alternate embodiment as shown in FIG. 3, the first passage 40 and the second passage 50 extending into control chamber 30 may have a common passage 60', a common meter-in orifice 62', and a common check valve 64 at the intersection of the first passage 40, the second passage 50, and the common passage 60'.

Figure 4:
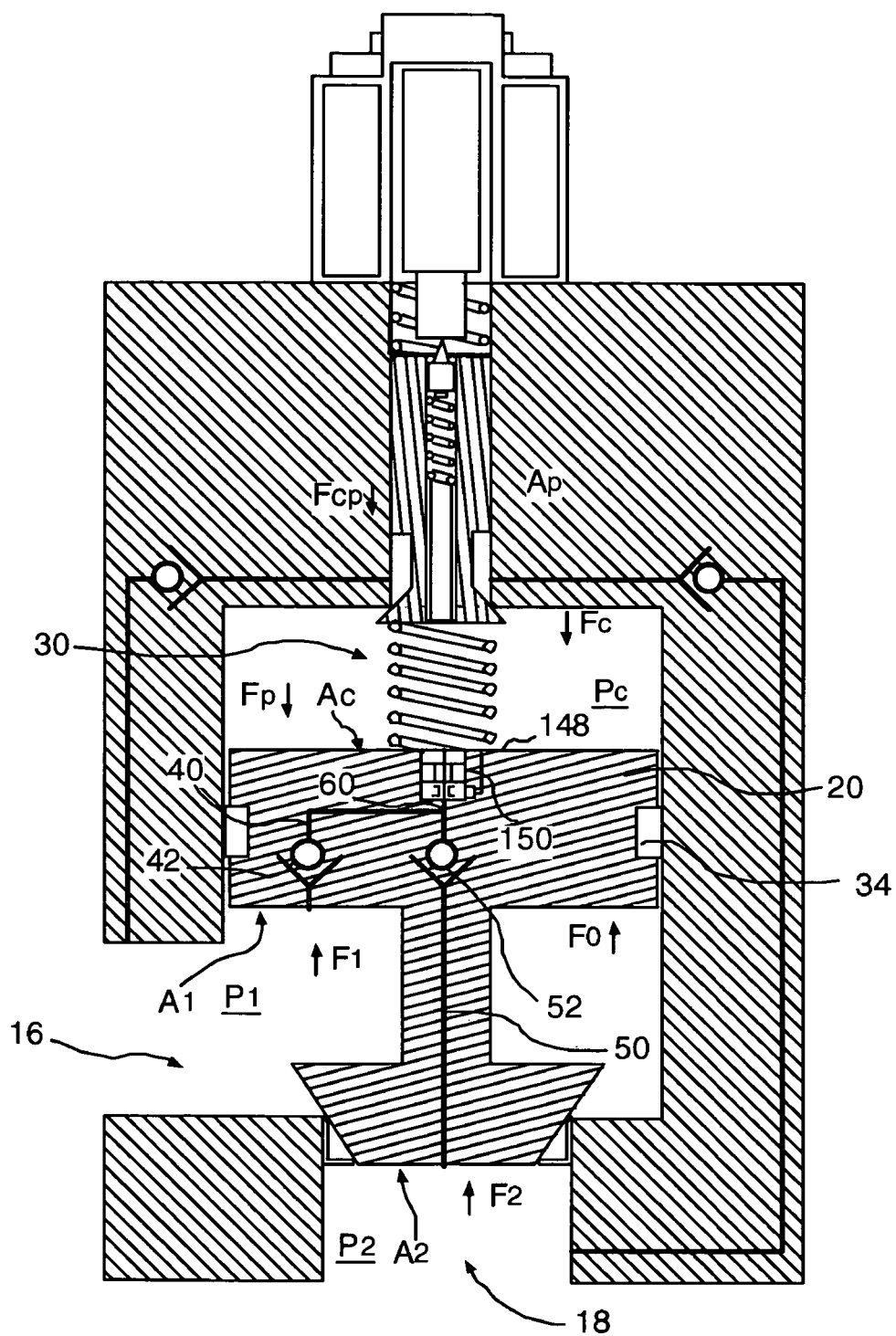
FIG. 4 is a sectional view of an exemplary force feedback poppet valve according to yet another embodiment of the disclosure.

The common meter-in orifice 62 or 62' may be a fixed orifice or a variable orifice. The variable orifice may change its opening area in function of differential pressure, which allows control of the meter-in flow to control chamber 30 when the main poppet 20 is in an open position. The opening area of the orifice may be larger at low pressure differential, which allows the main poppet 20 to be responsive in the closing direction at low pressure differential. In the embodiment shown in FIG. 4, the variable orifice 62 may be a flow regulator 150. The flow regulator 150 may maintain the meter-in flow substantially constant, and thus maintain a substantially constant speed of the main poppet 20.

Figure 5:
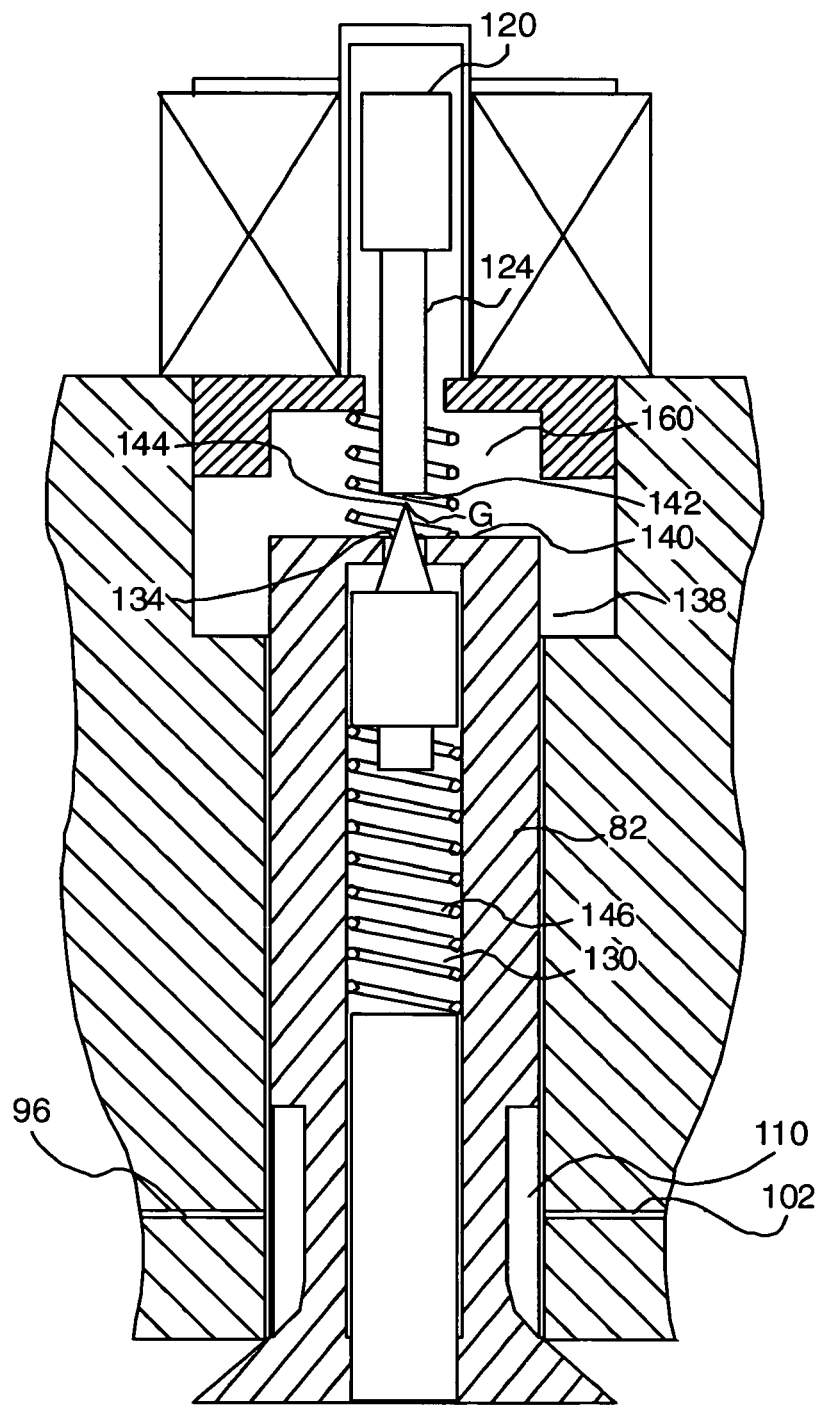
FIG. 5 is a diagrammatic view of an exemplary needle valve according to one embodiment of the disclosure.

FIG. 5 shows an enlarged view of the needle valve 136. As shown in FIG. 5, when the actuator 120 is deactivated and the armature 124 is in a released position, there is a gap G between an upper surface 140 of the pilot poppet 82 and a bottom surface 142 of the armature 124. The upper surface 140 of the pilot poppet 82 includes the aperture 134 fluidly connecting the passage 130 to the armature chamber 138. A leak path may exist from the control chamber 30 to the armature chamber 138 through the pilot passage 130, and from the armature chamber 138 to the annular chamber 110 along sidewalls of the pilot poppet 82 of the pilot valve 80. The needle valve 136 may include a conical tip 144 adapted to selectively open and close the aperture 134 of the pilot passage 130. The conical tip 144 may be attached on a resilient member 146. The resilient member 146 may be a leaf spring or a coil spring and is adapted to bias the conical tip 144 against the aperture 134 to seal the aperture 134. When in a closed position, the conical tip 144 may extend through the aperture 134 to a point above the upper surface 140 of the pilot poppet 82, and may seal the aperture 134, and thus may prevent undesired leakage along the leak path.

When a small current is applied to the electromagnetic coil 122, the armature 124 is forced down to move the conical tip 144 downward to open the aperture 134, so that fluid can flow from the control chamber 30 through the passage 130 out of the aperture 134 to the armature chamber 138, which results in the pressure on the upper end of the pilot poppet 82 exposed to the armature chamber 138 being substantially equal to the pressure on the lower end of the pilot poppet 82 exposed to the control chamber 30. By having an equalized pressure on the upper end and the lower end of the pilot poppet 82, only a small force is needed to open the pilot valve 80. When the electrical current in the coil 122 increases, the armature 124 moves down to push the pilot poppet 82 toward the main poppet 20 to open the pilot valve 80 to allow the fluid to flow from the control chamber 30 to the annular chamber 110, then through the annular chamber 110 to the third and the fourth passages 96 and 102. The aperture 134 and the needle valve 136 may be sized to allow the following: with an increasing coil actuation current, the armature 124 may push down the conical tip 144 first against system pressure, and consequently moving the pilot poppet 82 down gradually.

In another embodiment, the aperture 134 may be relatively large, and may still allow opening against maximum system pressure, but may require a special opening current strategy to enable gradual opening of the pilot poppet 82. The current may need to be reduced right after opening the needle valve 136 to use the full opening modulation range of the pilot poppet 82.

Industrial Applicability

The disclosed force feedback poppet valve may be applicable to any fluid actuator where precise control of pressures and/or flows of fluid associated with the actuator is desired. The disclosed valve may provide high-response pressure regulation that results in consistent, predictable actuator performance in a low-cost, simple configuration. The operation of force feedback poppet valve 10 will now be explained.

The normal use of the force feedback poppet valve 10 is to control fluid flow between the first port 16 and the second port 18. One example of such usage, as shown in FIG. 1, is having one of the first port 16 and the second port 18 connected to a first pressure source 202, and the other port connected to a second pressure source 204, for controlling the flow of pressurized fluid from one of the first pressure source 202 and the second pressure source 204 which has a higher fluid pressure to the other pressure source which has a lower fluid pressure. In one embodiment, one of the first port 16 and the second port 18 is connected to a pump, and the other port is connected to a hydraulic actuator. Another example would be to have one of the first port 16 and second port 18 connected to a hydraulic actuator, and the other port connected to a low pressure source or tank. The hydraulic actuator may be, for example, a cylinder or a fluid motor.

The main poppet 20 may be continuously urged in a valve opening direction toward the pilot valve 80 by the pressurized fluid having a fluid pressure P1 in the first port 16 acting on the surface exposed to the fluid in the first port 16 and the pressurized fluid having a fluid pressure P2 in the second port 18 acting on the surface exposed to the fluid in the second port 18. The fluid in the control chamber 30 may have a pressure Pc acting on the upper surface 28. As described above, the upper surface of the main poppet 28 exposed to the fluid in the control chamber 30 may have an effective surface area Ac. The area of the end surface 24 and the area of the seating surface 26 exposed to the fluid in the second port 18 may have an effective surface area value A2. An effective surface area A1 on the lower surface 32 may be defined by A1=Ac-A2.

In an equilibrium condition, a valve opening force Fo applied in an upward direction on the main poppet 20 equals a valve closing force Fc applied in a downward direction on the main poppet 20. The valve closing force Fc equals a force Fp applied to the upper surface 28 by the fluid pressure Pc in the control chamber 30 combined with a force Fs applied by the feedback spring 90. The valve opening force Fo equals to a force F1 applied to the effective surface area A1 by the fluid pressure P1 in the first port 16 plus a force F2 applied to the effective surface area A2 by the fluid pressure P2 in the second port 18. The forces applied to the main poppet 20 can be represented by the following equations (Friction forces and damping forces on the main poppet 20 are neglected):

$Fp=Pc*Ac;$ $F1=P1*A1;$ $F2=P2*A2;$ $Fc=Fp+Fs;$ $Fo=F1+F2;$ and $Fc=Fo$ (in an equilibrium condition.)

Fluid communication between the first port 16 and the second port 18 may be initiated by applying an electrical signal to the coil 122 of the actuator 120 to move the armature 124 downward, so that a control force is exerted against the conical tip 144 of the needle valve 136 in a downward or valve opening direction. Downward movement of the armature 124 initially opens the needle valve 136 and allows the fluid to flow from the control chamber 30 to the armature chamber 138 through the passage 130 to equalize the pressure on the upper end and the lower end of the pilot poppet 82. When the electrical current in the coil 122 of the actuator 120 increases, the armature 124 applies a control force Fcp to move the pilot poppet 82 toward the main poppet 20 to open the pilot poppet 82 and subsequently to allow the fluid to flow from the control chamber 30 to the annular chamber 110 through the meter-out orifice 111. Then, the fluid may flow from the annular chamber 110 to the first port 16 or the second port 18 whichever has a lower pressure.

In a situation that the pressure P1 in the first port 16 is greater than the pressure P2 in the second port 18, the pressure Pc in the control chamber 30 is lower than the pressure P1 in the first port 16 and greater than the pressure P2 in the second port 18, and the fluid may flow from the first port 16 to the control chamber 30 through the first passage 40. In a situation that P2 is greater than P1, the pressure Pc in the control chamber 30 is greater than P1 but lower than P2 and the fluid may flow from the second port 18 to the control chamber 30 through the second passage 50. The diameter of the meter-in orifice 44 in the first passage 40 and the meter-in orifice 54 in the second passage 50 may be predetermined to provide a desired response time of the main poppet 20.

When the combined upward force acting on the main poppet 20 by the pressure in the first port 16 and the pressure in the second port 18 is greater than the combined downward force acting on the main poppet 20 by the pressure in the control chamber 30 and the feedback spring 90, the main poppet 20 may be forced upwardly in a valve opening direction to initially move the seating surface 26 away from the valve seat 22 and subsequently may establish fluid communication between the first port 16 and the second port 18. The upward movement of the main poppet 20 in the valve opening direction compresses the feedback spring 90 which exerts a feedback force Fsp against the pilot poppet 82 to counteract the control force Fcp caused by the electrical current in the coil 122. The feedback spring 90 also applies the force Fs, which is equal to the force Fsp, against the upper surface 28 of the main poppet 20. During the upward movement of the main poppet 20, the compression of the feedback spring 90 increases until the pilot poppet 82 is balanced.

The feedback force Fsp applied by the feedback spring 90 on the pilot poppet 82 may continue to increase during the upward movement of the main poppet 20. When the pilot poppet 82 reaches an equilibrium condition, the feedback force Fsp equals the control force Fcp on the pilot poppet 82. In this situation, the displacement of the main poppet 20 is proportional to the level of the control force Fcp exerted on the pilot valve 80 by the armature 124. Such displacement of the main poppet 20 and the degree of opening of the valve controlled by the main poppet 20 may be varied by controlling the electrical current applied to the actuator 120. A new position of the main poppet 20 may be obtained by increasing or decreasing the electrical current applied to the solenoid coil 122. Complete removal of the electrical current results in the pilot poppet 82 moving to a closed position. When the fluid pressure in the first port 16 or the second port 18 decreases, which may result in that the combined upward force acting on the main poppet 20 by the pressure in the first port 16 and the pressure in the second port 18 is smaller than the combined downward force acting on the main poppet 20 by the pressure in the control chamber 30 and the feedback spring 90, the main poppet 20 may be moved back to a closed position, blocking the fluid communication between the first port 16 and the second port 18.

In a situation that the pressure P2 in the second port 18 is greater than the pressure P1 in the first port 16, a similar process may occur except that the fluid may flow in a reversed direction. In this situation, the fluid in the control chamber 30 may flow to the first port 16, and the fluid pressure Pc in the control chamber 30 may be reduced. As previously described, reducing the fluid pressure Pc in the control chamber 30 may reduce the valve closing force Fc exerted on the main poppet 20 and eventually the valve opening force Fo becomes greater than the valve closing force Fc, thereby causing the main poppet 20 to move upwardly to open the fluid communication between the first port 16 and the second port 18.

Several advantages over the prior art may be associated with the disclosed valve system. The disclosed valve system provides a force feedback valve and allows bidirectional controls of the force feedback valve. Moreover, the disclosed valve system provides a mechanism allowing to use a small electrical current to control the opening of the force feedback valve. The disclosed valve system also provides a mechanism for monitoring and controlling the degree of opening of the force feedback valve.

It will be apparent to those skilled in the art that various modifications and variations can be made to the force feedback poppet valve. Other embodiments will be apparent to those skilled in the art from consideration of the specification and practice of the disclosed force feedback poppet valve. It is intended that the specification and examples be considered as exemplary only, with a true scope being indicated by the following claims and their equivalents.

What is claimed is:

1. A valve comprising:
    a valve body including a main chamber having a first port and a second port;
    a main poppet disposed within the main chamber and being slidable between an open position and a closed position to control fluid flow between the first port and the second port, the main poppet having a first surface forming a control chamber within the main chamber;
    a first passage communicating the control chamber with the first port, the first passage having a check valve therein allowing fluid to flow from the first port to the control chamber, and a second passage communicating the control chamber with the second port, the second passage having a check valve therein allowing fluid to flow from the second port to the control chamber;
    a pilot valve having a pilot poppet for controlling fluid flow between the control chamber and the first port through a third passage, and for controlling fluid flow between the control chamber and the second port through a fourth passage; and
    a spring coupled between the main poppet and the pilot poppet to provide a force relative to a distance between the main poppet and the pilot poppet to close the pilot valve.

2. The valve of claim 1, wherein the first passage includes an orifice to restrict the flow of the fluid from the first port to the control chamber, and the second passage includes an orifice to restrict the flow of the fluid from the second port to the control chamber.

3. The valve of claim 1, wherein the first passage and the second passage include a common orifice to control the flow of the fluid in the first and the second passages.

4. The valve of claim 3, wherein the common orifice is a variable orifice adapted to regulate fluid flow rate through the first and the second passages to the control chamber in response to a pressure differential across the variable orifice.

5. The valve of claim 4, wherein the variable orifice includes a flow regulator to maintain a substantially constant fluid flow rate through the first passage or the second passage to the control chamber.

6. The valve of claim 1, wherein the pilot poppet includes a pilot passage fluidly communicating the control chamber with an armature chamber.

7. The valve of claim 6, further including a needle valve, wherein the needle valve is adapted to selectively open and close the pilot passage to the armature chamber.

8. The valve of claim 7, wherein the needle valve is selectively opened by an actuator to equalize pressure on one end of the pilot poppet exposed to the control chamber with pressure on the other end of the pilot poppet exposed to the armature chamber.

9. The valve of claim 7, wherein the needle valve includes a conical tip adapted to selectively close the pilot passage between the control chamber and the armature chamber.

10. The valve of claim 1, wherein the third passage includes a check valve therein allowing fluid to flow from the control chamber to the first port, and wherein the fourth passage includes a check valve therein allowing fluid to flow from the control chamber to the second port.

11. The valve of claim 1, wherein the first passage and the second passage are connected to the control chamber through a common check valve allowing fluid to flow from one of the first port and the second port to the control chamber.

12. The valve of claim 1, wherein the third passage and the fourth passage are connected to the control chamber through a common check valve allowing fluid to flow from the control chamber to one of the first port and the second port.

13. A method of controlling fluid communication between a first port and a second port communicating with a main chamber, the main chamber having a main poppet slidably received within the main chamber, the main poppet being adapted to block fluid communication between the first port and the second port in a closed position, and allow fluid communication between the first port and the second port in an open position, and the main poppet having a first surface forming a control chamber within the main chamber, wherein fluid in the control chamber is adapted to apply a pressure to the main poppet in a valve closing direction, and fluid in the first and the second ports is adapted to apply a pressure to the main poppet in a valve opening direction, the method comprising:
opening a pilot valve to allow a flow of fluid from the control chamber to one of the first port and the second port whichever has a lower pressure;
directing a flow of fluid from one of the first port and the second port whichever has a higher pressure to the control chamber;
when combined force acting on the main poppet in the valve opening direction is greater than combined force acting on the main poppet in the valve closing direction, moving the main poppet in the valve opening direction to allow the fluid communication between the first port and the second port; and
applying a force relative to a distance between the main poppet and the pilot valve to close the pilot valve.

14. The method of claim 13, wherein applying a force includes applying a force to the pilot valve by a spring disposed between the main poppet and the pilot valve.

15. The method of claim 13, wherein directing a flow of fluid from one of the first port and the second port whichever has a higher pressure to the control chamber includes directing a flow of fluid from one of the first port and the second port whichever has a higher pressure to the control chamber through a first passage connecting the first port with the control chamber, or a second passage connecting the second port with the control chamber, each passage including an orifice for controlling the fluid flow from the first port or the second port to the control chamber.

16. The method of claim 13, wherein opening the pilot valve to allow a flow of fluid from the control chamber to one of the first port and the second port whichever has a lower pressure includes opening the pilot valve to allow a flow of fluid from the control chamber to one of the first port and the second port whichever has a lower pressure through a third passage connecting the control chamber with the first port, or a fourth passage connecting the control chamber with the second port, each passage including a check valve therein allowing fluid to flow from the control chamber to the first port or the second port, respectively.

17. The method of claim 13, further including maintaining a substantially constant flow rate of fluid from one of the first port and the second port to the control chamber through the first and the second passages.

18. A valve comprising:
a valve body including a main chamber having a first port coupled to a first pressure source and a second port coupled to a second pressure source;
a main poppet disposed within the main chamber and being movable between an open position and a closed position to control fluid flow between the first port and the second port, the main poppet having a first surface forming a control chamber within the main chamber;
a first passage communicating the control chamber with the first port, the first passage having a check valve therein allowing fluid to flow from the first port to the control chamber, and a second passage communicating the control chamber with the second port, the second passage having a check valve therein allowing fluid to flow from the second port to the control chamber;
a pilot valve having a pilot poppet for controlling fluid flow from the control chamber to the first port through a third passage, and for controlling fluid flow from the control chamber to the second port through a fourth passage; and
a spring coupled between the main poppet and the pilot valve poppet to provide a force relative to a distance between the main poppet and the pilot poppet to close the pilot valve.

19. The valve of claim 18, wherein the first passage includes an orifice for controlling the flow of the fluid from the first port to the control chamber, and the second passage includes an orifice for controlling the flow of the fluid from the second port to the control chamber.

20. The valve of claim 18, wherein the first passage and the second passage include a common orifice to control the flow of the fluid in the first and the second passages, and wherein the common orifice is a variable orifice adapted to regulate fluid flow rate through the first and the second passages to the control chamber in response to a pressure differential across the variable orifice.

21. A valve comprising:
a valve body including a main chamber having a first port and a second port;
a main poppet disposed within the main chamber and being slidable between an open position and a closed position to control fluid flow between the first port and the second port, the main poppet having a first surface forming a control chamber within the main chamber;
a first passage communicating the control chamber with the first port, the first passage having a check valve therein allowing fluid to flow from the first port to the control chamber, and a second passage communicating the control chamber with the second port, the second passage having a check valve therein allowing fluid to flow from the second port to the control chamber, wherein the first passage and the second passage include a common orifice to control the flow of the fluid in the first and the second passages;
a pilot valve having a pilot poppet for controlling fluid flow between the control chamber and the first port through a third passage, and for controlling fluid flow between the control chamber and the second port through a fourth passage; and a spring coupled between the main poppet and the pilot poppet to provide a force relative to a distance between the main poppet and the pilot poppet.

22. The valve of claim 21, wherein the common orifice is a variable orifice adapted to regulate fluid flow rate through the first and the second passages to the control chamber in response to a pressure differential across the variable orifice.

23. The valve of claim 22, wherein the variable orifice includes a flow regulator to maintain a substantially constant fluid flow rate through the first passage or the second passage to the control chamber.

24. The valve of claim 21, wherein the pilot poppet includes a pilot passage fluidly communicating the control chamber with an armature chamber.

25. The valve of claim 24, further including a needle valve, wherein the needle valve is adapted to selectively open and close the pilot passage to the armature chamber.

* * * * *